April 28, 1959 W. DUBILIER 2,884,605
ELECTRICAL SUPPRESSOR
Filed Jan. 20, 1954 4 Sheets-Sheet 1
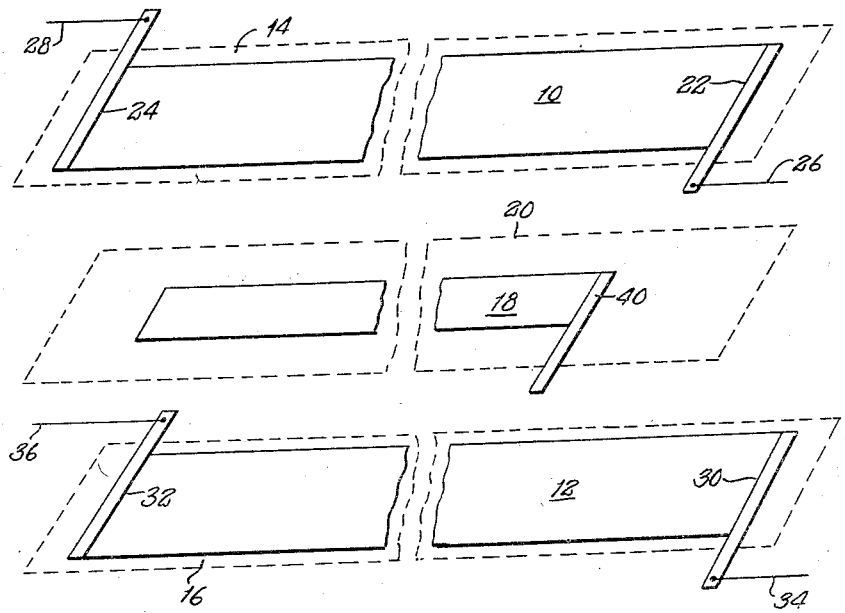
Fig. 1.
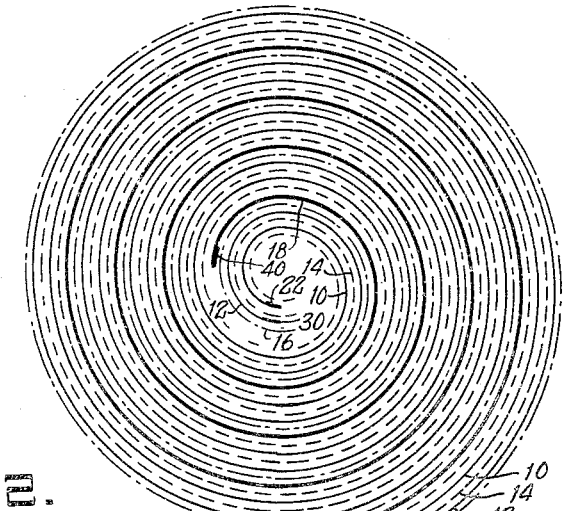
Fig. 2.
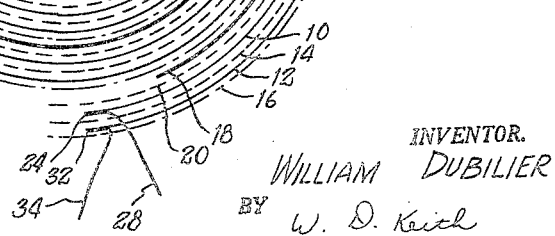
INVENTOR.
WILLIAM DUBILIER
BY W. D. Keith
ATTORNEY April 28, 1959   W. DUBILIER   2,884,605
ELECTRICAL SUPPRESSOR
Filed Jan. 20, 1954   4 Sheets-Sheet 2
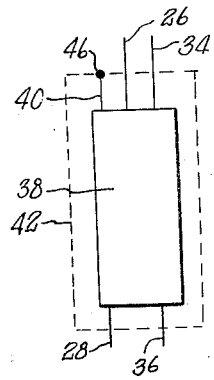
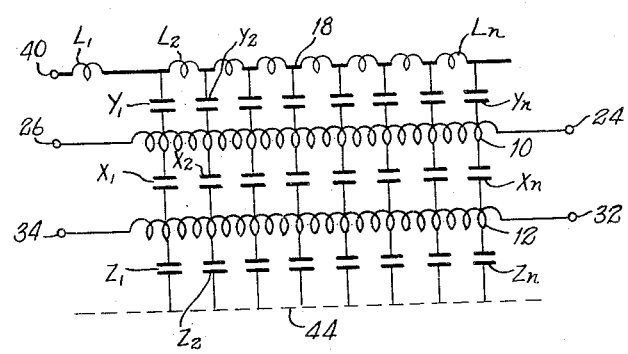
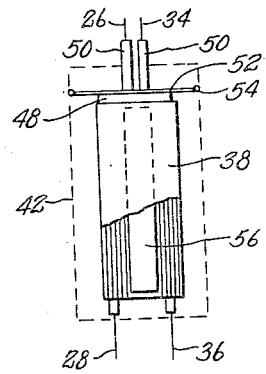
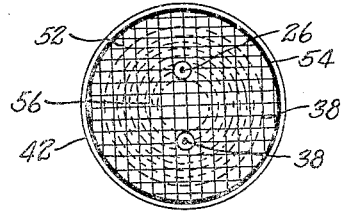
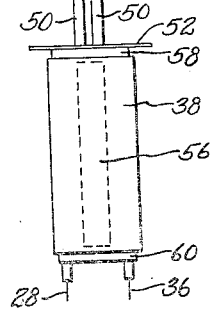
INVENTOR.
WILLIAM DUBILIER
BY W. D. Keith
ATTORNEY April 28, 1959      W. DUBILIER      2,884,605
ELECTRICAL SUPPRESSOR
Filed Jan. 20, 1954      4 Sheets-Sheet 3
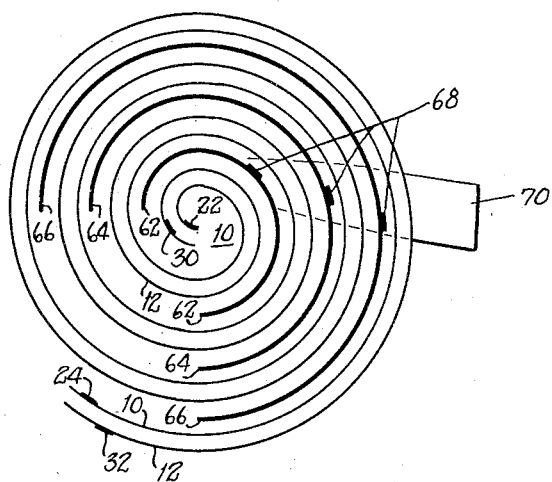
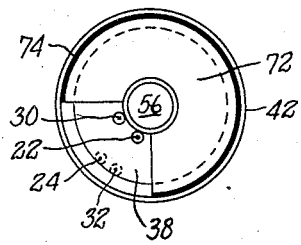
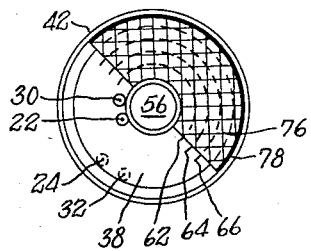
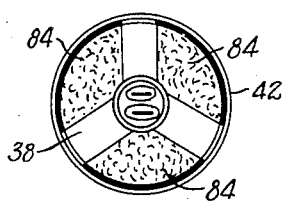
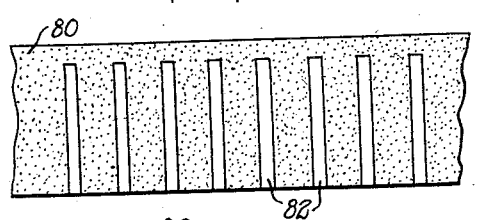
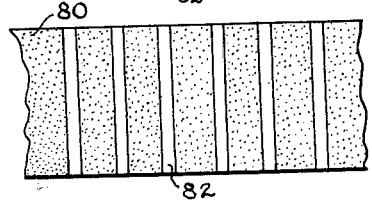
INVENTOR.
WILLIAM DUBILIER
BY W. D. Keith
ATTORNEY April 28, 1959  W. DUBILIER  2,884,605
ELECTRICAL SUPPRESSOR
Filed Jan. 20, 1954  4 Sheets-Sheet 4

INVENTOR.
WILLIAM DUBILIER
BY W. D. Keith
ATTORNEY

United States Patent Office 2,884,605
Patented Apr. 28, 1959

2,884,605
ELECTRICAL SUPPRESSOR

William Dubilier, New Rochelle, N.Y., assignor to Cornell-Dubilier Electric Corporation, South Plainfield, N.J., a corporation of Delaware Application January 20, 1954, Serial No. 405,091

Claims priority, application Great Britain September 11, 1953

1 Claim. (Cl. 333—79)

This invention relates to electrical suppressor capacitor arrangements used for the suppression of interference with radio apparatus from other electrical apparatus. In such arrangements the suppressor capacitor may be used either on the supply circuit connection to the electrical apparatus to prevent such apparatus from interfering with radio apparatus or on the main supply circuit to the radio apparatus to shield such apparatus from interference arising in or conducted by such supply circuit. The term "interfering circuit" will be used herein to denote the circuit on which the suppressor capacitor is used, whether such circuit is connected to the interfering apparatus or to the radio apparatus to be shielded from interference.

Copending United States patent application, Serial No. 371,923, filed August 3, 1953, relates to such a suppressor capacitor arrangement and, according to the invention thereof, the two electrodes of the suppressor capacitor are respectively connected in series with the two leads of a double-pole interfering circuit.

Preferably, the two electrodes of the capacitor are respectively constituted by two continuous metal layers which are wound into a roll or folded into a stack with intervening dielectric layers which overlap the side edges of the metal layers, the two ends of each metal layer being formed as or connected to terminals which protrude from the dielectric layers for connection to the parts of the corresponding lead of the interfering circuit. The metal layers may be constituted by metallic coatings on the dielectric layers or by separate metal strips interleaved with the dielectric layers.

The specification of such copending application mentions that additional capacitors may be provided between the conductors of the interfering circuit and earth, and that such capacitors may be wound around the main capacitor roll.

The present invention has for its object to provide an improved arrangement for providing additional capacitances between the suppressor capacitor electrodes and earth or a surrounding metal casing.

The suppressor capacitor arrangement according to the present invention comprises a capacitor having two electrodes which are respectively connected in series with the two leads of a double-pole interfering circuit and are constituted respectively by two continuous metal layers wound into a roll with intervening dielectric layers overlapping the side edges of the metal layers, such electrodes having capacitances to earth or to a surrounding metal casing provided by an additional metal layer wound into the roll with the main metal layers and intervening dielectric layers. Preferably, the two ends of each of the two main metal layers are formed as or connected to terminals which protrude from the dielectric layers for connection to the parts of the corresponding lead of the interfering circuit, and the additional metal layer is also provided with a protruding terminal for connection to earth or to the surrounding casing.

In one arrangement, the dielectric layers overlap both side edges of the additional metal layer.

In an alternative arrangement, at least one side edge of the additional metal layer extends to or overlaps the corresponding side edges of the dielectric layers and is directly connected to a terminal member connected to earth or to the surrounding metal casing. Whilst in general with this arrangement, from the viewpoint of efficiency of this bypass to earth for the interfering voltages, it is preferable to make this terminal connection as short and as broad as possible, it is also usually important to prevent the terminal connection from acting as a short-circuited turn with respect to the inductance of the wound main electrodes and thereby largely destroying their inductive effect. Various alternatives may be used, giving a compromise between these conflicting requirements.

Thus, the additional metal layer may, at least for the major portion of its width, be divided into a number of sections, each extending for a part only of one turn of the roll, the lengths of the sections being such that they will register approximately with one another. In such case, the terminal connection from the additional metal layer to earth or to the surrounding casing preferably occupies part only of the area of the end of the roll and leaves at least one part of such area substantially clear from the inside to the outside of the roll.

Alternatively, the additional metal layer may be short in length in comparison with the main electrode layers, so as to extend for only a relatively few turns of the roll. In such case, some portion of the inductive effect of the main electrode layers can often be preserved, if the short additional metal layer occupies the first few turns at the inner part of the roll, and the terminal connection therefrom to earth or to the casing occupies a part only of the area of the end of the roll.

In a further alternative arrangement according to the invention, for use when direct capacitance between the two main electrode layers is not of importance, these layers may be wound consecutively into the roll so that one occupies only the inner turns of the roll and the other only the outer turns in the roll, the additional metal layer being interleaved with such main electrode layers and with the dielectric layers so as to have capacitance to each of the main electrode layers.

With the foregoing arrangements, it is often convenient to wind the layers of the capacitor around a core of magnetic material.

The invention also comprises a suppressor capacitor unit, for use in any of the foregoing arrangements, comprising two main electrodes constituted respectively by two continuous metal layers which together with an additional metal layer are wound into a roll with intervening dielectric layers overlapping both side edges of the main electrode layers, four terminals protruding from the dielectric layers at the ends of the roll and connected to the inner and outer ends of the main electrode layers, and a further terminal connected to the additional layer. Such capacitor unit is preferably surrounded by a metal casing to which the terminal connected to the additional layer is connected.

The invention may be carried into practice in various ways, but some convenient alternative arrangements of suppressor capacitor according thereto are illustrated by way of example in the accompanying drawings, in which Fig. 1 is a diagrammatic representation of the various layers of the capacitor in one arrangement;

Fig. 2 is a diagrammatic end view of the capacitor of Fig. 1;

Fig. 3 shows the capacitor of Figs. 1 and 2 in side view;

Fig. 4 illustrates the distribution of the capacitances and inductances in the arrangement of Figs. 1–3;

Figs. 5 and 6 are side and end views of an alternative arrrangement;

Fig. 7 is a side view of a modification of the arrangement of Figs. 5 and 6;

Fig. 8 is a diagrammatic end view of the metal layers in the capacitor roll in a further alternative arrangement;

Figure 13:
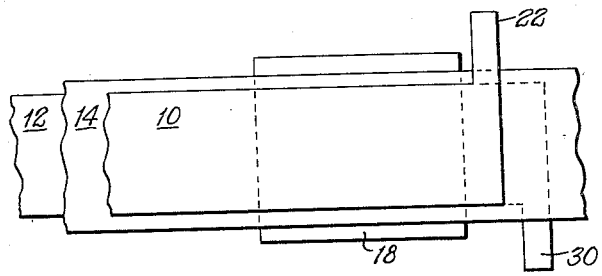
Figure 14:
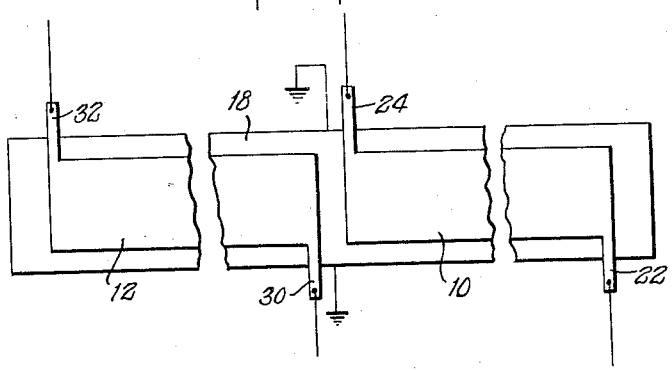
Figure 15:
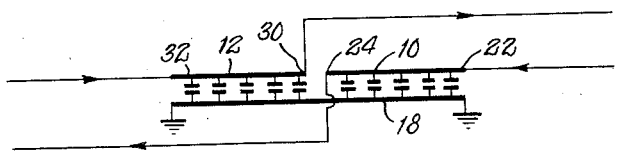

Figs. 9 and 10, respectively, show modifications of the arrangement of Fig. 8;

Fig. 11 illustrates a metallized dielectric strip for providing the additional metal layer in another arrangement;

Fig. 11A illustrates another metallized dielectric strip for providing the additional metal layer in another arrangement;

Fig. 12 is an end view of the capacitor roll in the arrangement of Fig. 11;

Fig. 13 shows one end of the various layers ready for winding into the roll in a further arrangement;

Fig. 14 is a development of the metal layers in yet another alternative arrangement; and Fig. 15 illustrates the circuit connections in the arrangement of Fig. 14.

In the arrangement of Figs. 1–3, the capacitor comprises two narrow strips 10 and 12 of metal foil, constituting the capacitor electrodes, interleaved with wider dielectric strips 14 and 16, for example of paper, an additional metal foil strip 18 with a further dielectric strip 20 being interposed between the main electrode strips 10 and 12. The various layers, which are shown developed flat in Fig. 1, are spirally wound together into a roll, as indicated in Fig. 2. Each of the dielectric strips 14, 16, 20 may consist of one or more thicknesses, these strips overlapping both side edges of the metal foil strips 10, 12, 18. Metal terminal tabs 22 and 24 are soldered or otherwise electrically connected to the inner and outer ends of the metal foil strip 10 for connection to leads 26 and 28 forming part of the interfering circuit, and the other electrode strip 12 is similarly provided at its inner and outer ends with terminal tabs 30 and 32 for connection to leads 34 and 36 forming part of the other pole of the interfering circuit. The terminal tabs 22 and 30 at the inner ends of the strips are taken out at one end of the wound roll 38, and the tabs 24 and 32 are taken out at the other end of the roll 38, so that there are two terminals, one of each polarity, at each end of the roll.

A metal terminal tab 40 is similarly connected to the additional metal foil strip 18, for example at one end or at the center thereof, and is taken out at one end of the roll. A metal enclosure 42 of any suitable form, for example a cylindrical casing, surrounds the wound roll 38, and the terminal tab 40 is connected as at 46 by soldering or otherwise to this casing. The casing 42 is preferably earthed, but it will be appreciated that a similar result can be obtained if the casing is connected to the casing of the interfering apparatus and is insulated from earth.

When the metal and dielectric strips have been wound into the roll 38, there will be a capacitance between the lower side of the electrode 10 and the upper side of the additional metal strip 18 (as viewed in Fig. 1) and a capacitance between the lower side of the strip 18 and the upper side of the other electrode 12, as well as a direct capacitance between the upper side of the electrode 10 and the lower side of the electrode 12. These three capacitances are distributed throughout the lengths of the strips and are represented in the diagram of Fig. 4, respectively, by the three groups of elementary capacitances $Y_1, Y_2 \ldots Y_n, Z_1, Z_2 \ldots Z_n$ and $X_1, X_2 \ldots X_n$. For convenience of illustration, to show these capacitances clearly, the additional metal strip 18 is shown in full line at the top of the figure and again in dotted line at 44 at the bottom of the figure. The electrodes 10 and 12 are drawn as inductances to represent the inductances they have owing to the spiral winding in the roll.

With this arrangement, the series inductances of the main electrodes 10 and 12, together with the mutual inductance and the capacitance directly between these electrodes, act as a suppressor for the symmetrical component of the interfering voltages between the two main conductors, whilst the capacitances from both the main electrodes to the additional earthing electrode 18 provide a bypass to earth for the asymmetrical components of the interfering voltages. In this way, a very efficient suppression of the interference can be secured over a wide range of frequencies.

From the viewpoint of efficiency of this bypass to earth, it would be desirable to make the additional layer 18 as non-inductive as possible by taking its edges past the edges of the dielectric strips and directly connecting them to the casing 42 with a uniform connection. If this were done, however, the short-circuited edges of the strip 18 would act as a short-circuited turn with respect to the inductances of the wound electrodes 10 and 12 and would thus largely destroy their inductive effect and thereby diminish the efficiency of the suppressor, especially for the higher frequencies. In order to avoid this effect, the additional layer 18 is made narrower than the dielectric strips without overlap, and connection is made to it by means of the terminal tab 40, as above described, notwithstanding the fact that this of necessity introduces some inductance into the earthing connection, this small inductance being distributed along the length of the strip 18 as represented at $L_1 L_2 \ldots$ in Fig. 4. It is sometimes desirable, for safety reasons, to make the strip 18 quite narrow, so that its capacitance to each of the electrodes 10 and 12 will be much less than the direct capacitance between the two electrodes themselves.

Whilst it will usually be preferable to reduce somewhat the efficiency of the earthing connection in this way in order to preserve the inductive effect of the wound electrodes, it may sometimes be desirable to adopt the converse arrangement, and such an arrangement as illustrated in Figs. 5 and 6 and in a modified form in Fig. 7.

In the arrangement of Figs. 5 and 6, one edge of the strip 18 is arranged to overlap the side edges of the dielectric strips, as indicated at 48 in Fig. 5, the connections from the electrode terminal tabs 22 and 30 to the external leads 26 and 34 being brought out through insulating sleeving 50 passing through the ring of upstanding foil edges 48. In order to provide a substantially uniform connection from the casing 42 over the entire area of the projecting foil edges 48 at the end of the roll, a gauze disc 52 fitting closely within the casing 42 is passed over the terminal connection sleeves 50 and is soldered to the foil edges 48 and to the casing at 54 to provide an intimate and direct connection from the strip 18 to the casing. This greatly improves the efficiency of the earthing connection, but at the expense, as above indicated, of greatly reducing the inductive effect of the wound electrodes 10 and 12. Some slight degree of compensation for this loss of inductance can be obtained by winding the strips of the capacitor around a magnetic core 56, part of the wound roll 38 being broken away in Fig. 5 to show this core 56. Although this core may be made long enough to extend beyond the ends of the capacitor roll, it will usually be preferable for its length to be slightly less than the width of the dielectric strips in order not to interfere with the gauze end fitting arrangement.

In the modified arrangement of Fig. 7, the edges of the strip 18 are made to overlap both side edges of the dielectric strips, as indicated at 58 and 60. The gauze connection 52 may in this case be fitted at either end of the roll 38, or, if desired, two gauze discs may be used, one at each end.

It will be appreciated that any or all of the metal foil strips used in the foregoing arrangements to constitute the main and additional electrodes of the capacitor may be replaced, if desired, by metallized coatings on the dielectric strips. If a metallized coating is used for the additional electrode 18 in the arrangements of Figs. 5–7, there need not be any protruding foil edges 48, 58, 60, but in practice, if the metallization is taken right to the edge of the dielectric strip, a satisfactory soldering connection can be made to the edge of such metallization in much the same way as to the protruding foil edges 48, 58, 60.

In the alternative arrangement indicated in Fig. 8, the continuous additional metal foil strip 18 of Figs. 1–3 is replaced by a series of short foil strip sections 62, 64, 66, each extending for a part only of a single turn in the roll. Each of these strip sections is provided with a terminal tab connection 68, the projecting ends of these tabs being arranged to lie approximately in line with one another, so that they can be directly soldered or otherwise connected to a wider metal tab or strip 70 which is in turn soldered to the metal casing (not shown). For the sake of simplicity, the interleaved dielectric strips 14, 16, 20 are omitted from Fig. 8, such dielectric strips being arranged in the manner already described with reference to Figs. 1–3. This arrangement avoids more than one tab connection being made to the additional electrode and thus minimizes interference with the inductive effect of the main electrodes.

Alternatively, the foil strip sections 62, 64, 66 may have one or each edge overlapping the dielectric strip edges, the protruding edges being soldered to a shaped disc 72, which in turn is soldered to the casing 42, as indicated at 74 in Fig. 9. It is important that the shape of the disc 72 should be such as to leave clear a sector-shaped portion of the end of the roll 38 extending right from the innermost turn of the roll to the outermost turn, in order to prevent the disc from acting as a short-circuited turn which would nullify the inductive effect of the main electrodes.

Alternatively, as shown in Fig. 10, the shaped disc 72 may be replaced by a shaped piece of metal gauze 76 soldered at 78 to the casing 42, the use of gauze facilitating the soldering of effective connections to the protruding foil edges. This figure also shows the foil strip sections 62, 64, 66 and the gauze 76 restricted to extend only over about half the area of the end of the roll 38. This minimizes the short-circuiting effect on the inductances of the main electrodes, but of course also reduces the effective capacitances to earth from such electrodes.

As in the arrangements of Figs. 5–7, it will often be desirable to provide a magnetic core 56 in the center of the roll to increase the inductive effects of the main electrodes 10 and 12. Such inductive effects will, of course, inevitably be reduced to some extent by the presence of the metal casing 42, unless the casing is divided by a slit to avoid forming a complete turn. The enclosure and sealing of the capacitor element in such instance may be completed for example by a resin seal across the gap or enclosing the metal casing.

Figs. 11, 11A and 12 illustrate a further modification, generally analogous to the arrangements of Figs. 8–10, but employing a metallized dielectric strip 80 to replace the foil strip sections 62, 64, 66. In this case, the desired sectioning effect is obtained by burning away parts of the metallization along transverse lines 82 or by suitable masking of the strip during the metallization process. These transverse lines 82 may extend very nearly right across the strip as illustrated in Fig. 11, or entirely across the strip as illustrated in Fig. 11A, the width of each line in relation to the width of the metallized portion between the line and the next line being chosen to suit requirements. The widths of the metallized areas between the lines 82 will progressively increase from one end of the strip to the other, so that the lines 82 will register with one another when the strip is wound into the roll, and will thus form one or more portions of the roll clear of metallization. Fig. 12 illustrates the soldering arrangements at one end of the roll 38, and in the example shown it is assumed that there are three of the lines 82 in each turn of the roll. For effecting the soldering, strip-like masks are placed over the ends of the roll covering the clear portions formed by the transverse lines 82, so as to leave exposed for soldering areas 84, which are of sufficient size to ensure satisfactory connection of the edges of the metallization to the surrounding casing 42, but which do not extend over the portions of the roll clear of metallization.

In order to reduce still further the short-circuiting effect of the connections to the casing 42, the width of the dielectric strip carrying the metallized pattern may be made greater than that of the remaining dielectric strips so that it extends beyond them, thus removing the short-circuiting ring of end connections further from the body of the roll. The central magnetic core, when one is used, is preferably arranged so that it does not project through this ring so that the magnitude of the magnetic flux penetrating the ring is thereby minimized.

Fig. 11A illustrates an alternative embodiment for a metallized electrode. In this embodiment the spacings 82 extend entirely across the strip and thereby avoid any possible length of a continuous conducting portion adjacent one edge of the strip. If the ends of this metallized strip are connected as illustrated in Fig. 12 in sections, the possibility of short circuits or any short-circuited turns is greatly reduced. In the utilization of this type of unit it may be found that some of the metal sections may not be connected, however most of them would be, and for practical results, a grounded unit throughout most of the condenser would be effected and the resultant unit would approach an ideal filter circuit as illustrated in Fig. 4.

Fig. 13 illustrates another way of preserving substantial inductive effect in the main electrodes, whilst yet having protruding foil edges for the additional electrode to give a highly efficient connection from such electrode to the casing. In this case, the main electrodes 10 and 12 and the dielectric strips, one of which is shown at 14, are arranged as in Figs. 1–3, but the additional electrode 18 is of short length so that it will only extend for a few turns in the wound roll. If this short additional electrode 18 is arranged at the end of the strips which will be innermost in the roll, the short-circuited turn effect produced by the protruding edges of such electrode will produce less reduction of the inductive effect of that part of the main electrodes which is wound outside the few turns incorporating the short additional electrode. In this case, the protruding edges of the short strip 18, at one or (as shown) at each end of the roll, will be soldered to a metal strip extending to and soldered to the casing, such metal strip being similar to the strip 70 of Fig. 8. Alternatively, a segmental connection may be used to the casing as in Fig. 10. The effect of using a short length of strip 18 is of course to reduce the capacitances of the main electrodes 10 and 12 to earth to a relatively small value, but such small value is often adequate for suppression purposes and as much as is permissible on the ground of safety when the auxiliary electrode is connected to an exposed casing of an interfering apparatus. With this construction it is not practicable to employ a magnetic core for the roll, since if this is done the short-circuited turn will annul the inductive effects of the main electrodes almost completely on account of the concentration of the magnetic flux in the core, which is necessarily inside the short-circuited turn.

In a further alternative arrangement according to the invention, as shown in Figs. 14 and 15, the two main electrodes 10 and 12, instead of being wound together in the roll so as to be interleaved with one another, are wound consecutively, so that the first electrode 10 extends only for the inner turns in the roll whilst the other electrode 12 extends only for the outer turns in the roll, the two electrodes lying end to end in contact with the same face of a single dielectric layer. The additional metal layer 18 is in contact with the opposite face of the same dielectric layer and is separated by a further dielectric layer from the other sides of the main electrode layer. The additional metal layer 18 is arranged to extend past the gap between the outer end of the first main electrode 10 and the inner end of the second main electrode 12, so as to lie in capacitative relationship with both main electrodes, and may extend for the full length of the two main electrodes. Terminal connections 22 and 24 are taken out from the two ends of the first electrode 10 and, together with similar terminal connections 30 and 32 from the ends of the second electrode 12, are connected to the leads of the interfering circuit, so that these electrodes lie in series in such circuit as in the foregoing arrangements, such connections being shown in Fig. 15, which also indicates the distributed capacitances between the main electrodes and the additional electrode 18, there being negligible direct capacitance between the two main electrodes themselves. The additional electrode 18 is connected to the casing surrounding the capacitor roll and any of the arrangements described above for the electrode 18 and for such connection can be employed in this arrangement (with the exception of course of the arrangement of Fig. 13).

It will be appreciated that the arrangement according to the present invention retains the advantages of the invention forming the subject of the copending application Serial No. 371,923, above mentioned, and reference should be made to the specification of such application for a full description of such advantages. Moreover, the various alternatives and modifications described in such specification are, in general, equally applicable to the present invention. Thus, for instance, the terminal tabs 22 and 30 (and likewise the tabs 24 and 32) may be brought out at opposite ends of the roll instead of at the same end.

Having thus described my invention, I claim:

An interference suppressor capacitor unit arranged for selective inclusion in a two-wire interfering circuit associated with an electrical system having a common base potential comprising a pair of continuous metal layers of substantially equal width in registry with one another and spirally wound with intervening dielectric layers of greater width than said metal layers into a convolute cylindrically shaped capacitor roll, terminal means for selectively connecting the inner and outer ends of each of said metal layers in series with one of the wires in said two-wire interfering circuit, a plurality of individual electrode elements in the form of metal layers disposed intermediate said first mentioned metal layers and insulated therefrom by dielectric material, said plurality of individual electrode elements being sized so as to be disposed in registry with one another within a predetermined radial segment of said convolutely wound unit, second terminal means for selectively electrically connecting at least some of said plurality of individual electrode elements disposed in registry in said wound unit to the common base potential for said electrical system.

References Cited in the file of this patent

UNITED STATES PATENTS

| | | |
|---|---|---|
| 2,027,067 | Schubert | Jan. 7, 1936 |
| 2,180,722 | Rust | Nov. 21, 1939 |
| 2,440,652 | Beverly | Apr. 27, 1940 |
| 2,521,513 | Gray | Sept. 5, 1950 |
| 2,536,580 | Spurr | Jan. 2, 1951 |
| 2,539,651 | Woodward | Jan. 30, 1951 |
| 2,552,306 | Beverly | May 8, 1951 |
| 2,565,093 | Robinson et al. | Aug. 21, 1951 |
| 2,724,062 | Nolde | Nov. 15, 1955 |

FOREIGN PATENTS

| | | |
|---|---|---|
| 449,742 | Great Britain | July 2, 1936 |